United States Patent [19]
Partow et al.

[11] Patent Number: 5,945,639
[45] Date of Patent: Aug. 31, 1999

[54] CANCELLATION OF COMMON-MODE SIGNALS IN DIGITIZING TABLET

[75] Inventors: Tony S. Partow; William K. Petty, both of Colorado Springs, Colo.

[73] Assignee: Hyundai Electronics America, San Jose, Calif.

[21] Appl. No.: 08/192,078

[22] Filed: Feb. 4, 1994

[51] Int. Cl.⁶ .................................................. G08C 21/00
[52] U.S. Cl. .................................... 178/18.03; 178/19.05
[58] Field of Search ........................... 178/18, 19, 18.03, 178/19.05, 19.01

[56] References Cited

U.S. PATENT DOCUMENTS

| | | | |
|---|---|---|---|
| 3,732,369 | 5/1973 | Cotter | 178/18 |
| 3,974,332 | 8/1976 | Abe et al. | 178/18 |
| 4,185,165 | 1/1980 | Fencl | 178/19 |
| 4,456,787 | 6/1984 | Schlosser et al. | 178/19 |
| 4,497,977 | 2/1985 | Saito et al. | 178/19 |
| 4,631,355 | 12/1986 | Federico et al. | 178/19 |
| 4,636,582 | 1/1987 | Moriwaki et al. | 178/18 |
| 4,644,102 | 2/1987 | Blesser et al. | 178/19 |
| 4,736,073 | 4/1988 | Abernethy | 178/19 |
| 4,788,384 | 11/1988 | Bruere-Dawson et al. | 178/18 |
| 4,853,497 | 8/1989 | Landmeier | 178/18 |
| 4,859,814 | 8/1989 | Sciacero et al. | 178/19 |
| 4,956,526 | 9/1990 | Murakami et al. | 178/18 |
| 5,008,497 | 4/1991 | Asher | 178/18 |
| 5,010,213 | 4/1991 | Moriwaki et al. | 178/18 |
| 5,124,509 | 6/1992 | Hoendervoogt et al. | 178/19 |
| 5,136,125 | 8/1992 | Russell | 178/19 |
| 5,218,173 | 6/1993 | Garwin et al. | 178/18 |
| 5,218,174 | 6/1993 | Gray et al. | 178/19 |

*Primary Examiner*—Don N. Vo
*Attorney, Agent, or Firm*—Townsend and Townsend and Crew LLP

[57] ABSTRACT

The invention concerns apparatus for processing signals induced by a stylus applied to a digitizing tablet. The tablet produces four signals, A, B, C, and D, indicative of four currents, induced at four different points on the tablet, by the stylus. The four signals indicate the position of the stylus. The invention derives stylus position based solely on two difference pairs (A–D) and (B–C). Further, the computation of the difference-pairs suppresses common-mode noise, which otherwise interferes with computation of stylus position.

4 Claims, 7 Drawing Sheets

CANCELLATION OF COMMON-MODE SIGNALS IN DIGITIZING TABLET

The invention concerns a stylus for use with a digitizing tablet. Such tablets can take the form of a transparent overlay atop the display of a portable computer.

BACKGROUND OF THE INVENTION

FIG. 1 is a highly simplified view of a digitizing tablet 3 and its associated stylus 6. There are four current-to-voltage amplifiers (labeled I-to-V), one at each corner. The stylus 6, when activated, produces a signal 9, as indicated in FIG. 2. This signal induces currents I1–I4, which are detected by the I-to-V amplifiers.

The I-to-V amplifiers each produce a voltage indicative of the size its respective current. Processing circuitry, known in the art, receives the voltage signals, and computes the position of the stylus signal 6.

The currents I1–I4 are induced because the stylus 6 acts as one plate of a capacitor. The digitizing tablet (which bears a resistive surface of a material such as indium tin oxide) acts as the other plate. As FIG. 3 indicates, when negative charge is applied to the tip 2 of the stylus 6, a positive charge is induced on the surface of the tablet 6. Currents I1–I4 supply this positive charge.

Conversely, as in FIG. 4, a positive charge on the tip 2 of the stylus 6 induces a negative charge on the tablet. The currents I1–I4 supply this negative charge.

Each current can be viewed as following a direct path from the stylus to one corner of the tablet. The resistance of each path depends on the length of the path. The size of the current traversing each path depends on the resistance. Thus, knowledge of the current allows one to infer the path length. A highly simplified example will illustrate.

Assume that the stylus in FIG. 5 represents a voltage source applied to the tablet. Four currents will be generated, each indicated by a dashed arrow running to a corner. The paths have the relative lengths shown in FIG. 5, and also listed the following Table.

TABLE

| PATH | RELATIVE LENGTH | RELATIVE RESISTANCE | RELATIVE CURRENT | RELATIVE I-to-V VOLTAGE |
|------|-----------------|---------------------|------------------|-------------------------|
| AA   | 0.66            | 0.66                | 1.52             | 1.52                    |
| BB   | 1.00            | 1.00                | 1.00             | 1.00                    |
| CC   | 0.93            | 0.93                | 1.08             | 1.08                    |
| DD   | 0.55            | 0.55                | 1.82             | 1.82                    |

The resistance of the path depends on the length, so that the relative resistances are in proportion to the relative path lengths, as indicated in the Table.

Current equals voltage divided by resistance, V/R, so that the relative currents will be inversely proportional to the relative path lengths, as indicated in the Table.

The I-to-V amplifiers in FIG. 1 each produce a voltage which is proportional to its respective current. Thus, the outputs of the I-to-V amplifiers have the relative magnitudes indicated in the Table. The output signals can be used to compute position of the stylus, as stated above.

Noise

The I-to-V amplifiers produce other, unwanted, signals, in addition to those generated by the stylus. For example, nearby cathode ray tubes, fluorescent lights, and electric motors induce charge on the digitizing pad. Many of these unwanted signals cause the I-to-V signals to each increase by a fixed value, at any given time. That is, these unwanted signals add a common-mode component to the I-to-V signals.

The common-mode signal interferes with computation of stylus position.

OBJECTS OF THE INVENTION

An object of the invention is to provide an improved approach to computation of stylus position on a digitizing tablet.

A further object of the invention is to reduce common-mode noise signals in a digitizing tablet.

SUMMARY OF THE INVENTION

In one form of the invention, differences between pairs of signals produced by I-to-V amplifiers are derived by subtraction in a difference amplifier. The subtraction removes the common-mode component. The resulting differences, which are free of noise signals, are used in computation of stylus position.

DETAILED DESCRIPTION OF THE INVENTION

Figure 6:
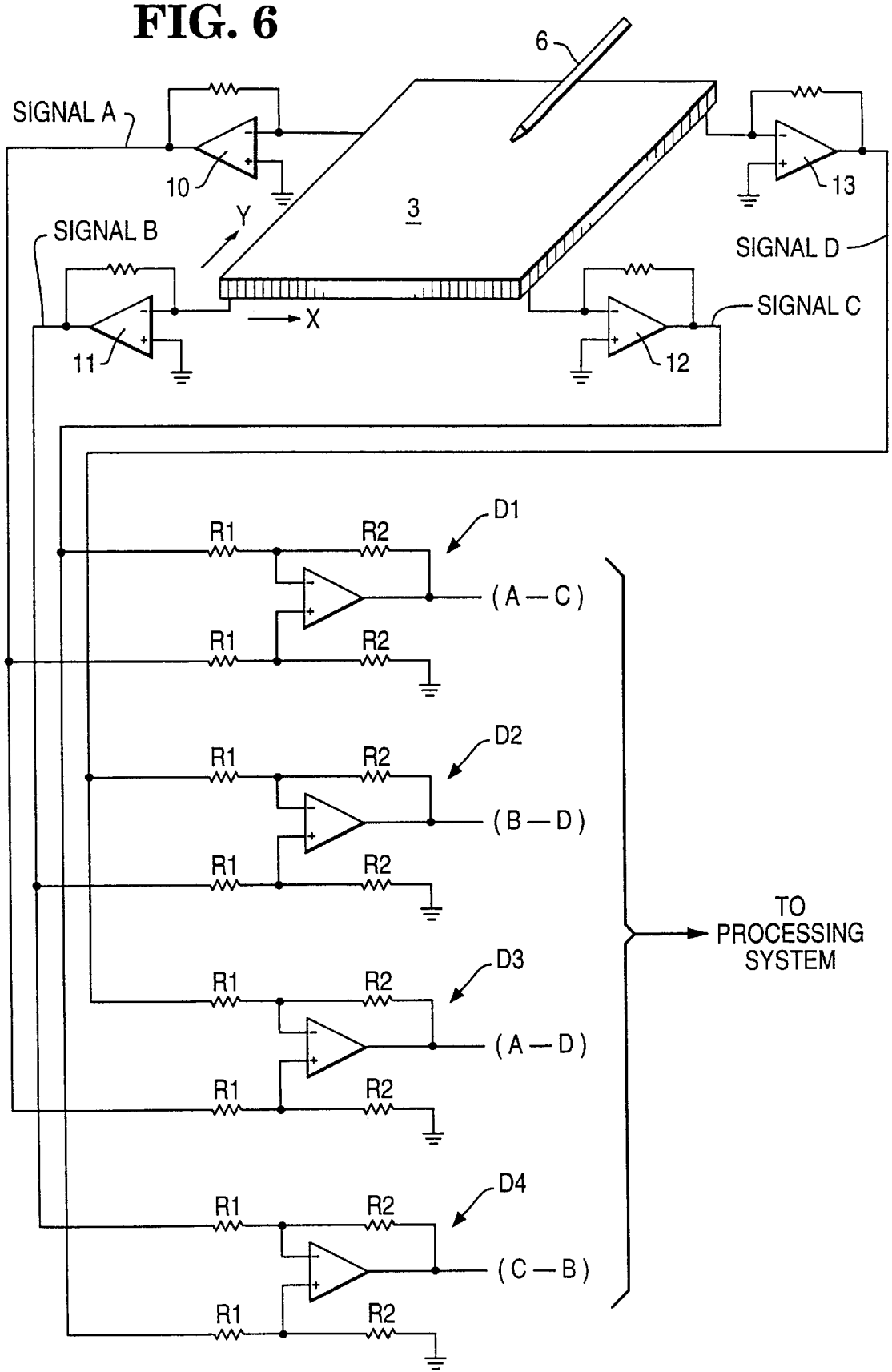
FIGS. 6–8 illustrate three forms of the invention.

FIG. 6 illustrates a digitizing tablet and its four I-to-V amplifiers 10, 11, 12, and 13, which produce respective signals A, B, C, and D. The x- and y-coordinates of the stylus 6 are derived by computations such as the following:

x=(A+B−C−D)/(A+B+C+D) (x-COMPUTATION)

y=(A+D−B−C)/(A+B+C+D) (y-COMPUTATION)

In these computations, the denominators act as normalizing factors. Other computations can be used, in which the normalizing factors are different. The invention is concerned with production of signals from which the numerators are computed.

The invention recognizes an important feature of these computations, namely, that each numerator is the SUM of a pair of DIFFERENCES. That is, in the x-COMPUTATION, the sum of the pair of differences is (A−C)+(B−D) or Computation (1)

(A−D)+(B−C). Computation (2)

In the y-COMPUTATION, the sum of pairs is (A−C) and (D−B) or Computation (3)

(A−B) and (D−C). Computation (4)

One Form of Invention

FIG. 6 shows one form of the invention. Four difference amplifiers D1–D4 produce four difference pairs, corresponding to the four difference pairs in the x- and y-COMPUTATIONs given above.

(Actually, the output of each difference amplifier equals (R2/R1)(V+−V−), wherein V+ refers to the non-inverting input of the op-amp, and V- refers to the inverting input. If R1=R2, then the output equals the true difference V2−V1. If R1 does not equal R2, then the difference is scaled by R2/R1.)

These difference pairs are fed to processing circuitry, which can take the form of a programmable digital computer, or dedicated computing circuitry, which utilize the pairs in computation of the x- and y-coordinates, as by using the x- and y-COMPUTATIONs given above, or another computation. In FIG. 6, the difference-pairs produced are suitable for Computation (1) and Computation (3).

Figure 7:
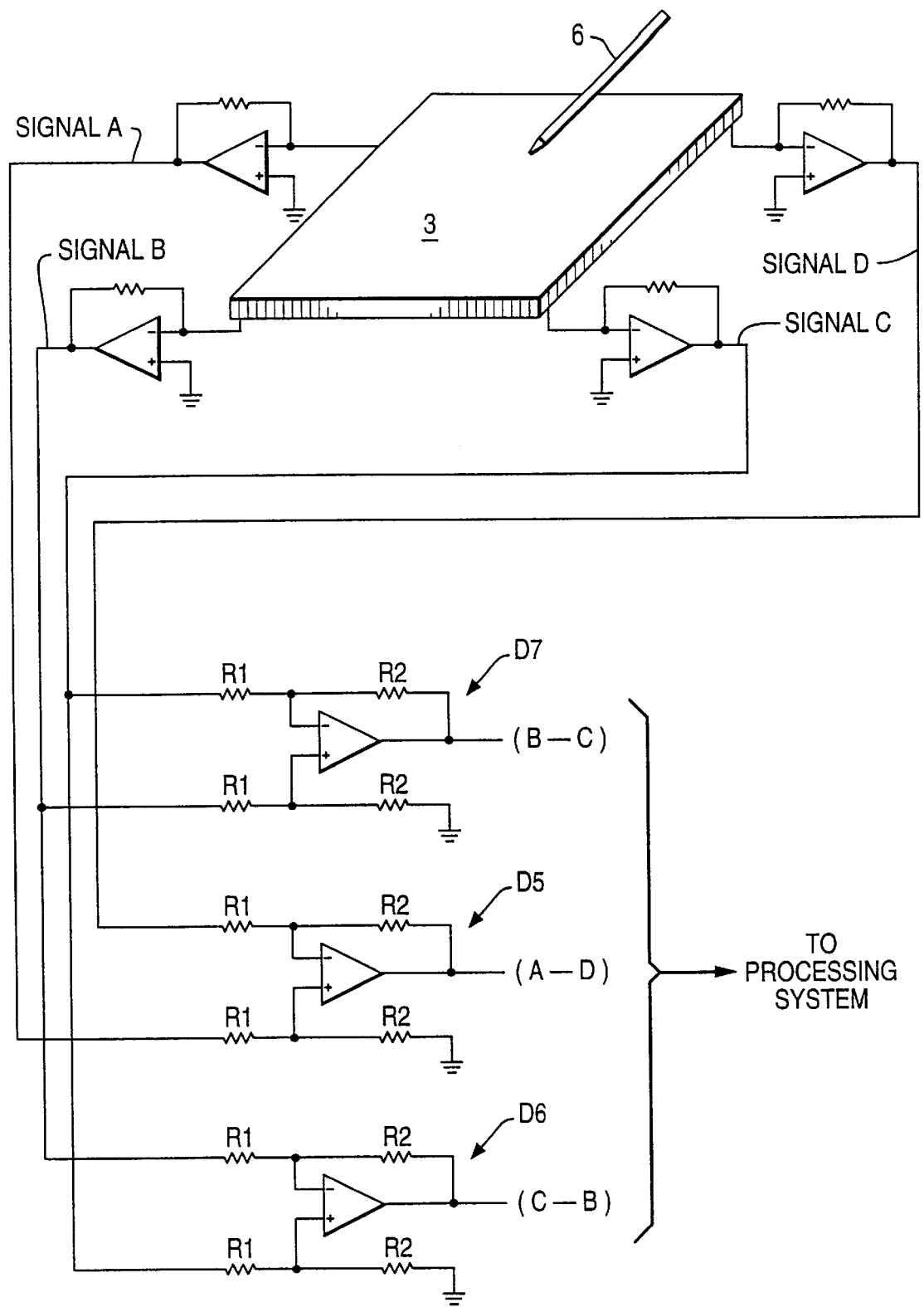

Second Form of Invention\
FIG. 7 shows another form of the invention. This form of the invention recognizes that the difference (A–D) occurs in the numerator of both Computation (2) and Computation (3), and thus need not be computed twice.

Three difference amplifiers, D5, D6, and D7, produce the three differences (A–D), (C–B) and (B–C).

These differences are fed to processing circuitry, for further computation.

Third Form of Invention

Figure 8:
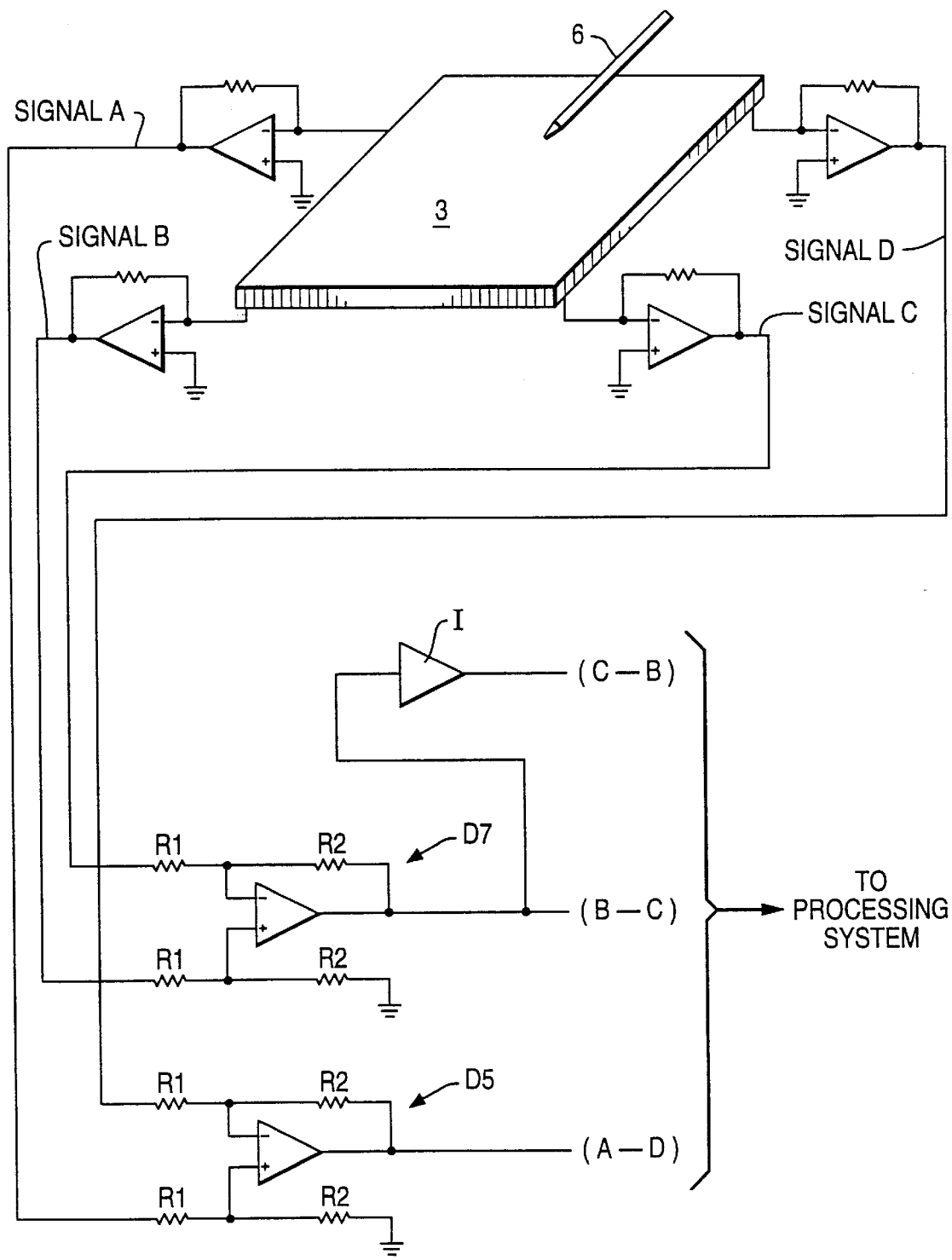

A third form of the invention is shown in FIG. 8. This alternate form recognizes that the difference pair (C–B) in Computation (2) is the algebraic negative of (B–C) in Computation (3). Consequently, the three difference amplifiers of FIG. 7 can be replaced by (a) two difference amplifiers D7 and D5, plus (b) an inverter I which inverts the output of D7.

Important Considerations

1. The difference amplifiers are chosen to provide a high common mode rejection ratio, CMRR. CMRR is defined in the art, and, preferably, is as high as feasible. In general, the accuracy of the computed coordinates increases as CMRR increases. The high CMRR eliminates, or reduces, the common-mode signal present in the inputs.

Figure 1:
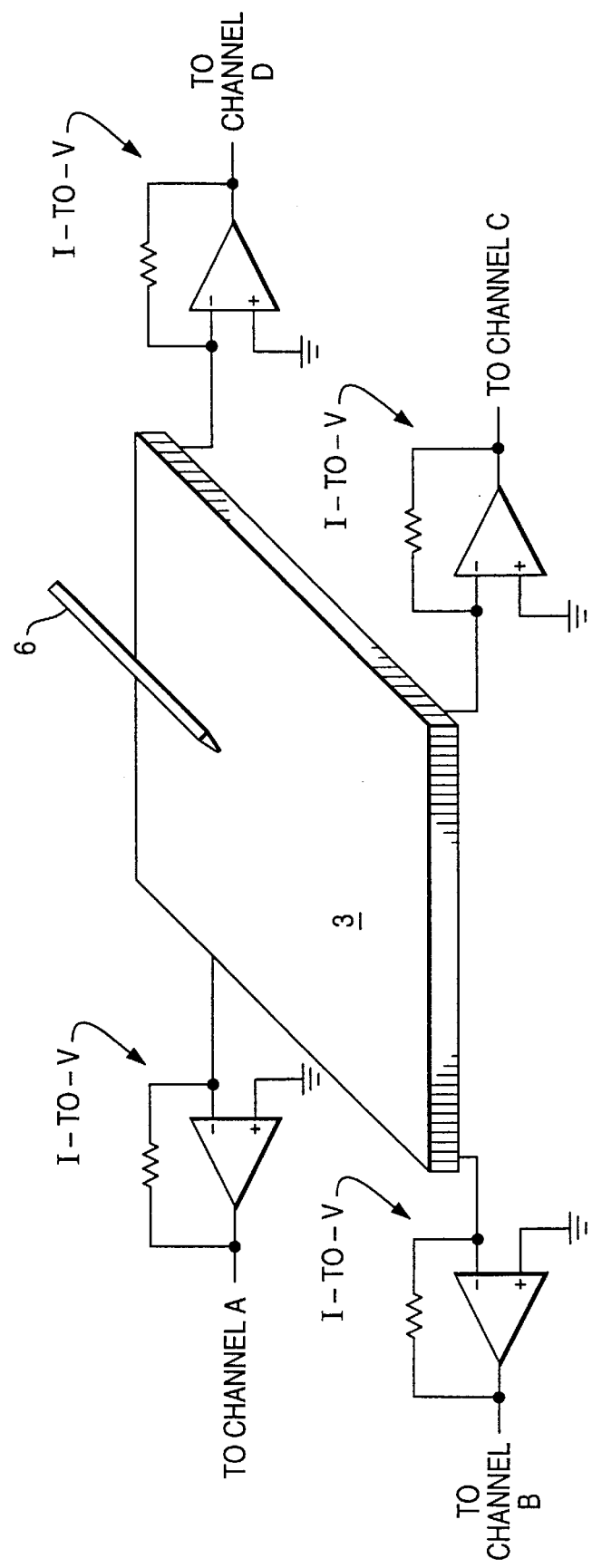
FIGS. 1 and 2 illustrate a digitizing tablet 3, and I-to-V (current-to-voltage) amplifiers which detect currents I1–I4.
Figure 2:
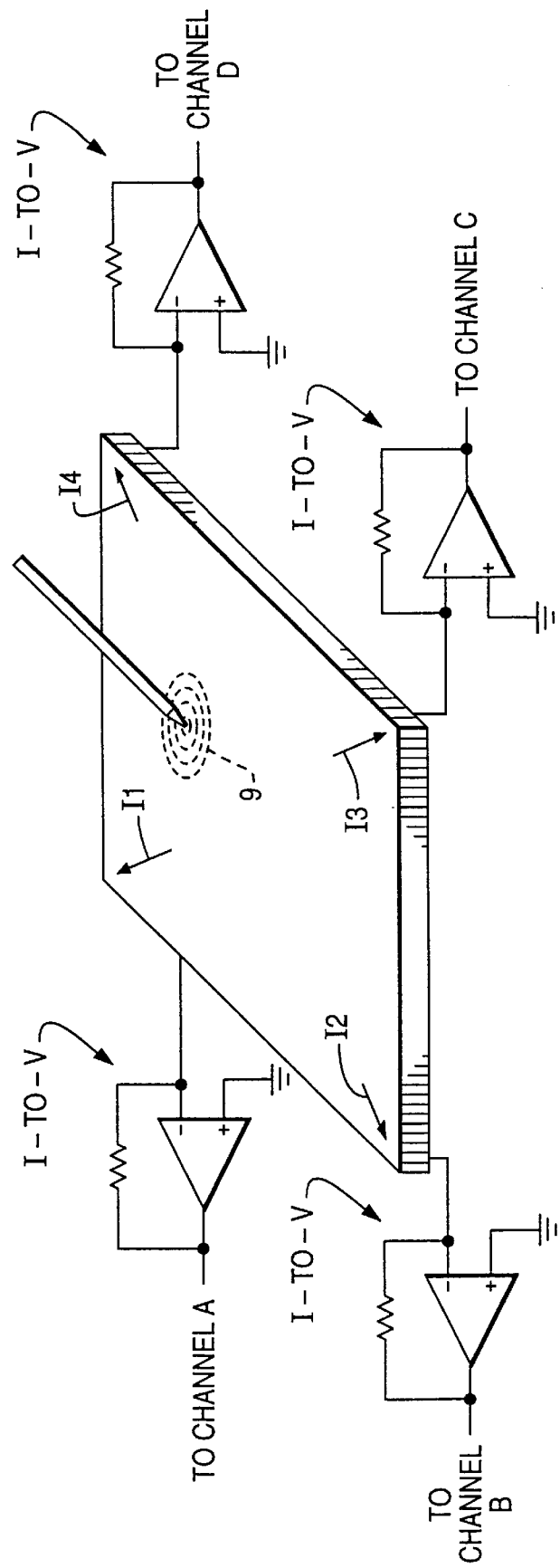
Figure 3:
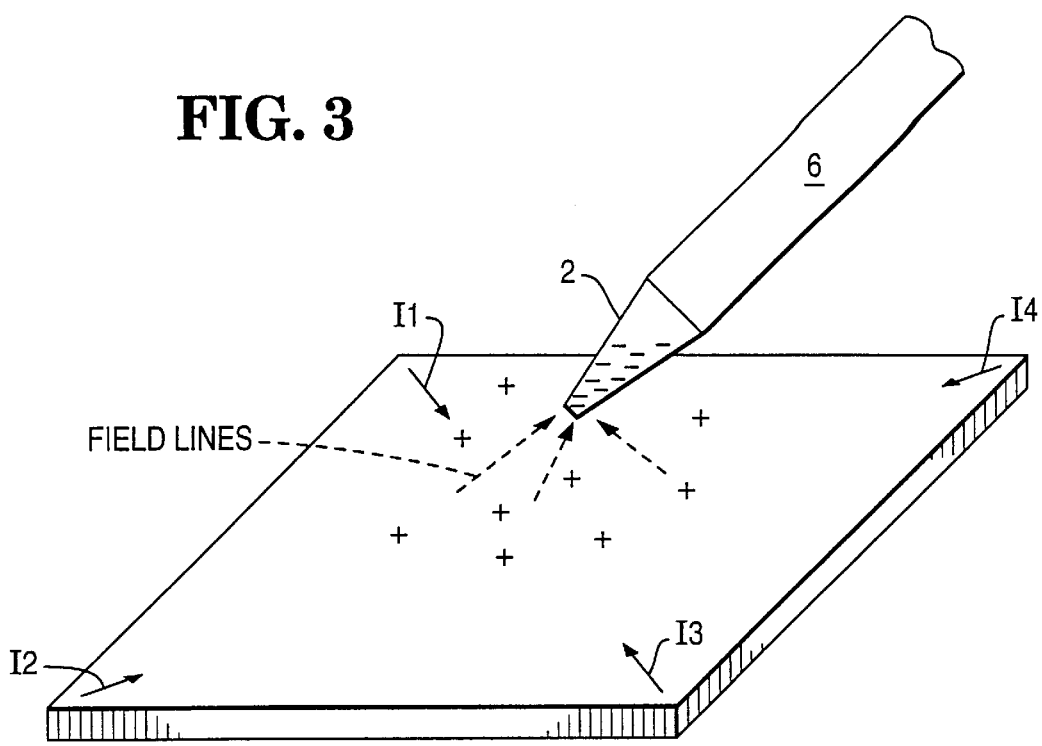
FIGS. 3 and 4 illustrate how charge on the tip 2 of the stylus 3 induces currents I1–I4.
Figure 4:
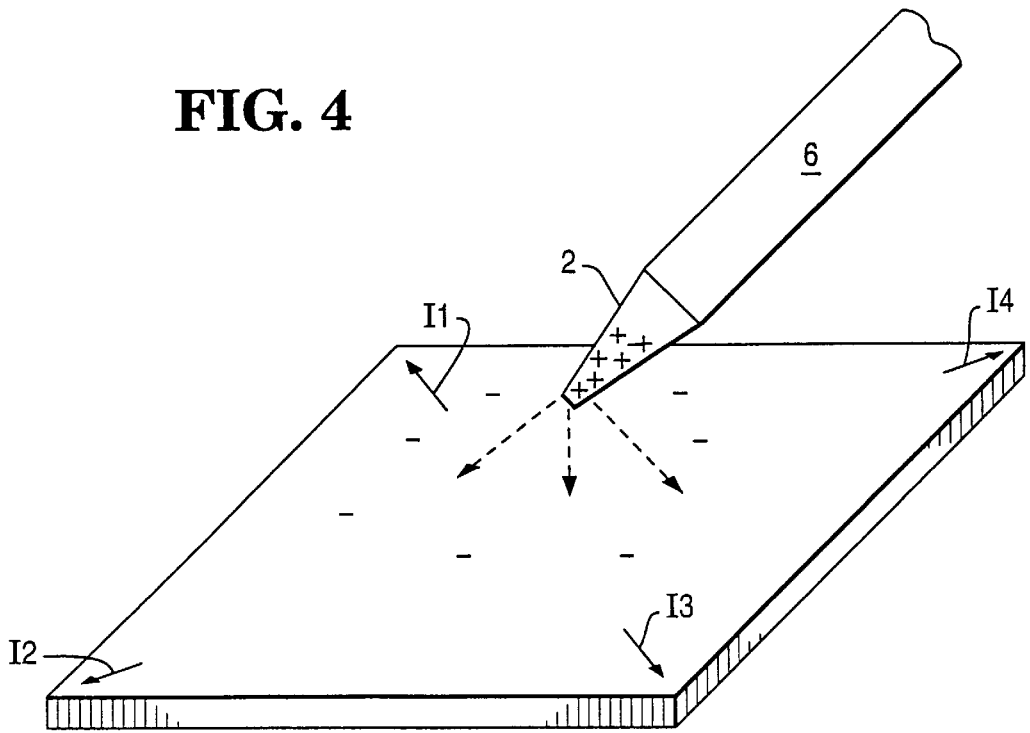
Figure 5:
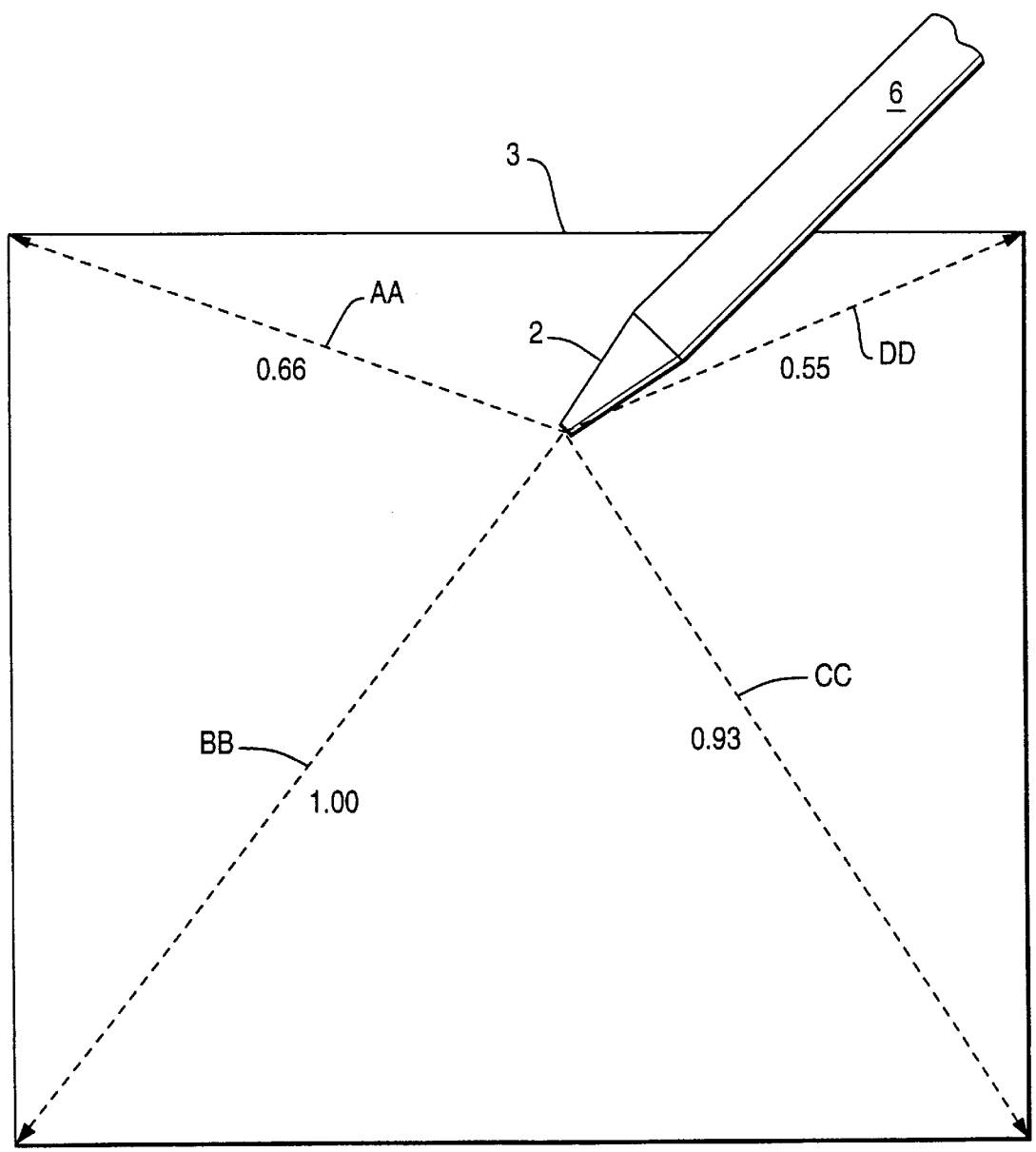
FIG. 5 illustrates current paths running from the tip of the stylus to corners of the tablet.

That is, assume that the measured signal A in FIG. 1 (produced by A's I-to-V) actually contains (signal A+NOISE), and, similarly, the measured signal B actually contains (signal B+NOISE). Taking the difference of these two signals in a difference amplifier, which has a high CMRR, produces the following output:

(signal A+NOISE)–(signal B–NOISE)=signal A–signal B. The NOISE in measured signal A cancels the noise in measured signal B.

2. Even though the x-COMPUTATION and the y-COMPUTATION, given above, seem to indicate that individual values of A, B, C, and D are required, closer inspection indicates that SUMS of pairs of differences will suffice, as in Computations (1) through (4). The individual values A, B, C, and D are not necessary.

Thus, the signals which are used by the invention, in Computations (1)–(4), are difference signals. Individual values of A, B, C, and D are not used.

Moreover, as FIG. 8 indicates, only TWO differences are needed, namely, (A–D) and (B–C). These two differences provide all the information needed to compute the numerators of both Computation (2) and Computation (3).

3. Further computations, in addition to Computations (1)–(4) can be undertaken, in order to obtain more precise position information. For example, a given digitizing tablet may have irregularities due to various causes. These irregularities can be measured, as by (1) locating a stylus at every possible position on the tablet, (2) recording the output signals A, B, C, and D, and comparing the output signals with the actual position. This procedure will produce table of errors.

Then, in use, when a signal is obtained from the tablet, it is modified by the corresponding error factor, in order to obtain corrected signals. When correction is undertaken, the stylus position is thus computed based on two types of input: position data, which is obtained from the stylus, and correction data, which is obtained from the table.

In the embodiment shown in FIG. 8, the sole stylus input to the computation consists of two difference signals.

The Inventors point out that corrections of this type can be done prior to, or after, Computations (1)–(4).

4. The signals A, B, C, and D are commonly produced by equipment which is commercially available. For example, digitizing tablets available from Scriptel Corporation, located in Columbus, Ohio. One form of the invention is an apparatus, or method, which takes the differences shown in FIGS. 6–8 between pairs of these signals.

5. The signals A, B, C, and D in FIG. 6 can be viewed as distance signals which indicate the distance of the stylus from the respective corners of the tablet. The distances may not be indicated directly by the signals, and the signals may need further processing to eliminate various errors, such as tablet-to-tablet manufacturing variations. Nevertheless, the signals are still distance signals, because they contain distance information.

6. The invention is significant from the perspective that a single process, or apparatus, simultaneously (a) suppresses the common-mode noise component in pairs of signal taken from A, B, C, and D, and (2) provides difference signals which are needed for Computations (1)–(4).

Further, the difference signal is derived from two information—bearing signals. This approach contrasts with other approaches, in which noise in a signal is suppressed by subtraction. However, in other approaches, the subtracted signal is not information-bearing or, if it is, the information is not used.

7. A "difference amplifier" is not the same as a "differential amplifier," although the former will probably use the latter. The difference between the two amplifiers is known in the art.

8. The I-to-V amplifiers need not measure currents induced at corners of the tablet, nor need the I-to-V amplifiers measure currents at symmetrical points on the tablet.

Numerous substitutions and modifications can be undertaken without departing from the true spirit and scope of the invention. What is desired to be secured by Letters Patent is the invention as defined in the following claims.

We claim:

1. In a digitizing tablet which produces four signals indicative of the distances of a stylus from four respective corners of the tablet, the improvement comprising:
   a) computing x-y position of the stylus using a computation based on differences between four pairs of distance signals; and
   b) deriving said differences using difference amplifiers which suppress common-mode signals in the distance signals.

2. A process for computing position of a stylus on a digitizing pad, comprising the following steps:
   a) producing signals A, B, C, and D by four detectors, located at respective corners of the tablet, in response to a signal produced by the stylus;
   b) using one or more difference amplifiers having a high CMRR, subtracting
      C from A, to produce (A–C),
      D from B, to produce (B–D),
      D from A, to produce (A–D),
      B from C, to produce (C–B), and
   c) producing the following sums:
      SUM 1: (A–C)+(B–D) and
      SUM 2 (A–D)+(C–B); and
   d) Dividing both SUM 1 and SUM 2 by the quantity (A+B+C+D).

3. A process for computing position of a stylus on a digitizing pad, comprising the following steps:
   a) producing signals A, B, C, and D by four detectors, in response to a signal produced by the stylus;
   b) using one or more amplifiers to generate a plurality of difference signals from said signals A, B, C and D; and
   c) adding together at least two of said difference signals to generate a first sum and adding together at least two of said difference signals to generate a second sum.

4. The method of claim 3 further comprising the step of dividing at least one of said first sum and said second sum by the quantity (A+B+C+D).

* * * * *